US010236109B1

(12) United States Patent
Robertson (10) Patent No.: US 10,236,109 B1
(45) Date of Patent: Mar. 19, 2019

(54) MAGNETIC SPRING ASSEMBLY FOR MASS DAMPERS

(71) Applicant: Glen A Robertson, Madison, AL (US)

(72) Inventor: Glen A Robertson, Madison, AL (US)

( * ) Notice: Subject to any disclaimer, the term of this patent is extended or adjusted under 35 U.S.C. 154(b) by 36 days.

(21) Appl. No.: 15/785,805

(22) Filed: Oct. 17, 2017

(51) Int. Cl.
| | | |
|---|---|---|
| H01F 7/122 | (2006.01) |
| H01F 27/33 | (2006.01) |
| F16F 6/00 | (2006.01) |
| H01F 7/16 | (2006.01) |
| H02K 21/04 | (2006.01) |
| H02K 21/44 | (2006.01) |
| F16F 1/36 | (2006.01) |
| H02K 33/12 | (2006.01) |
| H01F 7/20 | (2006.01) |
| F16F 7/10 | (2006.01) |
| F16F 7/104 | (2006.01) |

(52) U.S. Cl.
CPC .......... *H01F 7/122* (2013.01); *F16F 1/3615* (2013.01); *F16F 6/00* (2013.01); *H01F 7/1615* (2013.01); *H01F 27/33* (2013.01); *H02K 21/042* (2013.01); *H02K 21/44* (2013.01); *H02K 33/12* (2013.01); *F16F 7/104* (2013.01); *F16F 7/1011* (2013.01); *H01F 2007/208* (2013.01)

(58) Field of Classification Search
CPC ........ H01F 27/33; H01F 7/122; H01F 7/1615; H01F 2007/208; F16F 1/3615; F16F 7/1011; F16F 7/104; F16F 6/00; H02K 21/042; H02K 21/44; H02K 33/12
See application file for complete search history.

(56) References Cited

U.S. PATENT DOCUMENTS 2,434,337 A * 1/1948 Soderstrom ............ H02K 33/12
310/29
3,088,062 A * 4/1963 Hudimac ................. F16F 6/00
188/1.11 E (Continued)

FOREIGN PATENT DOCUMENTS

DE 2821842 A1 * 11/1979 ........... B25D 11/064
FR 1417292 A * 11/1965 ........... H01F 7/1646

*Primary Examiner* — Mohamad A Musleh (57) ABSTRACT

A magnetic spring assembly that uses the bistable magnetic nature of permanent magnets mediated by a spring material to allow one or more attached vibrating masses to take on the damping characteristics of the magnetic spring assembly includes a permanent magnet body with an attach point 15 for a first vibrating mass, two spring materials, and two magnetic disks firmly attached to a shaft having an attach point 23 for a second vibrating mass to manufacture a mass damper 20 for damping vibrations on at least one of the attached masses. The spring materials can be an elastic material or a spring that is placed between the magnetic disks and the magnetic body to allow the magnetic disks to vibrate in a spring like manner. Passive tuning of the damping characteristics of the magnetic spring assembly is achievable through selected force tuning between the magnetic force from the permanent magnet and the compression force of the spring materials, and active tuning of the magnetic spring assembly is achievable by adding control coils in the magnet body to alter the magnetic force or having spring materials with characteristics that are electrically control to alter the compression force.

15 Claims, 6 Drawing Sheets

(56) References Cited

U.S. PATENT DOCUMENTS

| | | | | |
|---|---|---|---|---|
| 3,202,886 A | * | 8/1965 | Kramer | H01F 7/1615 310/14 |
| 4,101,008 A | * | 7/1978 | Frosch | F16F 6/00 188/380 |
| 5,149,996 A | * | 9/1992 | Preston | H01F 7/1615 310/12.02 |
| 6,129,185 A | * | 10/2000 | Osterberg | F16F 6/00 188/267.2 |
| 2005/0168307 A1 | * | 8/2005 | Reynolds | F16F 6/00 335/220 |
| 2008/0284261 A1 | * | 11/2008 | Andrieux | F01L 9/04 310/30 |

* cited by examiner

MAGNETIC SPRING ASSEMBLY FOR MASS DAMPERS

FIELD OF THE INVENTION

The present invention pertains to the spring assembly in mass dampers for the damping of vibrations in a vibrating system, and more specifically to a magnetic spring assembly for mass dampers that uses the bistable magnetic nature of permanent magnets mediated by a spring material to allow one or more attached vibrating masses to take on the damping characteristics of the magnetic spring assembly. Passive tuning of the damping characteristics of the present invention is achievable through selected force tuning between the magnetic force from the permanent magnet and the compression force of the spring material, and active tuning of the present invention is achievable by adding control coils to alter the magnetic force or having a spring material with characteristics that are electrically control to alter its compression force.

BACKGROUND OF THE INVENTION

A mass damper or damper for short, damps vibrations in a vibrating system by having as the central active element a vibrating mass of its own, which vibrates opposite the vibration of the vibrating main object of the vibrating system. The vibrating mass of the damper may also be called counter vibrating mass, because it vibrates in antiphase to the exciting vibration of the vibrating system. In many mass dampers, the counter vibrating mass or damping mass forms, together with a damping spring, a physical pendulum, whose resonant frequency or damping characteristics is set at a certain ratio to the vibration frequency of the vibrating system, which such vibration frequency is to be damped. The mass damper can perform great deflections at the damping spring resonant frequency and extract vibration energy from the vibrating structure to be damped for its own vibration motions.

The present invention is based on the general idea of using the bistable flux nature of permanent magnets to produce a bistable magnetic force on magnetic disks mediated by a spring material to manufacture a magnetic spring assembly for mass dampers. The characteristics of the bistable magnetic response in the present invention is similar to the "Dual Position Latching Solenoid," U.S. Pat. No. 3,022,450, Pat. Date Feb. 20, 1962 and "Methods for Controlling the Path of Magnetic Flux from a Permanent Magnet and Devices Incorporating the Same," U.S. Pat. No. 6,246,561, Pat. Date Jun. 12, 2001. The magnetic response and magnetic pole movements is best described in U.S. Pat. No. 6,246,561, but the present invention has the solenoidal shape and cylindrical magnetic flux paths as in U.S. Pat. No. 3,022,450, although having external moveable magnetic poles as in U.S. Pat. No. 6,246,561.

In the aforementioned patents and when the power is removed from the control coils, the magnetic flux from the permanent magnet in a magnet body is given dual paths in the magnet body to form dual pole faces with the amount of magnetic flux in a given direction controlled by the gap between the magnet body and the moveable magnetic poles. This characteristic of the flux is called bistable as little change in the gap can cause a large change to the amount of flux and thus the magnetic force in a given direction, as the magnetic force is a function of the gap distance squared.

In the present invention, the flux from the permanent magnet is controlled by the design of the flux path to flow in equal directions through a magnetic body about the permanent magnet. Magnetic poles of equal characteristics and free to move with respect to the magnetic body are placed on either side of the magnetic body and prevented from magnetically latching to the magnet body by a non-magnetic spring material. The magnetic poles then become part of the flux path with the spring material determining the gap between the magnet body and the magnetic poles. When the gap is the same, the amount of flux in either direction through the magnetic body and magnetic poles are the same. As such the magnetic force on the magnetic poles are the same.

By firmly connecting the magnetic poles so they move as a single unit and when an external force is applied to the magnetic pole unit to change the gap from one side of the magnet body to the other, a gap offset will result. This gap offset establishes a magnetic force offset on the magnetic pole unit opposed by a compression force offset in the spring materials. Then when the external force is remove, the spring nature of the spring material will cause the magnetic poles to vibrate like a spring, damped by the magnetic force on the magnetic poles.

SUMMARY OF THE INVENTION

The basic object of the present invention is to provide a magnetic spring assembly for mass dampers in which the damping frequencies are passively tunable to change the resonant frequency of the present invention.

Another object of the present invention is to provide a magnetic spring assembly for mass dampers in which the damping frequencies are actively tunable to change the resonant frequency of the present invention.

In the passive tunable embodiment of the present invention, the resonant frequency of the vibration is dependent on the magnetic force on the magnetic poles and the compression force of the spring material. As such, by designing the magnetic force and compression force to be complementary to produce a constant force oscillation over small gap changes, a magnetic spring assembly for a mass damper is produced, wherein the resonant frequency is passively tuned for the mass damper application.

The present invention thus provides a magnetic spring assembly for mass dampers, which is passively tunable by changing the magnetic force and the characteristics of the spring material to change the resonant frequency of the present invention.

In the active tunable embodiment of the present invention, tuning of the present invention can be accomplished in several ways. For example, by placing control coils in the present invention, where when current flows through the control coils, the flux from the control coils will add to or subtract from the magnetic force, making it possible as a result to damp different frequencies with the same mass damper. As such, the resonant frequency of the present invention can be set depending on the amount and direction of the current applied to the control coils. Another example, if the spring material is an electro active polymer, in similar to U.S. Pat. No. 8,745,977, or an elastic medium conjoined with a piezoelectric material to change the elastic mediums thickness, the resonant frequency of the present invention can be set depending on an electric voltage applied to the electro active polymer or piezoelectric material. The electrical control means to power the control coils, electro active polymers or piezoelectric materials in the present invention can be of various designs useful to these active tunable purposes, one example being the control means in U.S. Pat. No. 8,745,977.

The present invention thus provides a magnetic spring assembly for mass dampers, in which the damping frequencies are actively tunable by use of an electrical control means to power control coils, electro active polymers or piezoelectric materials in the present invention to change the resonant frequency of the present invention.

It may be appreciated that the above-mentioned features, which will also be explained below, can be used not only in the particular combination indicated, but in other combinations or alone as well without going beyond the scope of the present invention. Preferred exemplary embodiments of the present invention are shown in the drawings and will be explained in more detail below, where identical reference numbers designate identical or similar or functionally identical components. The various features of novelty which characterize the present invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 are cross sectional views of two embodiments of the bistable permanent magnet spring portion of the present invention with different spring materials.

FIG. 2a is FIG. 1a firmly held in a first attachment housing and FIG. 2b is FIG. 1b firmly held in a first attachment housing;

DESCRIPTION OF THE PREFERRED EMBODIMENTS

Figure 1A:
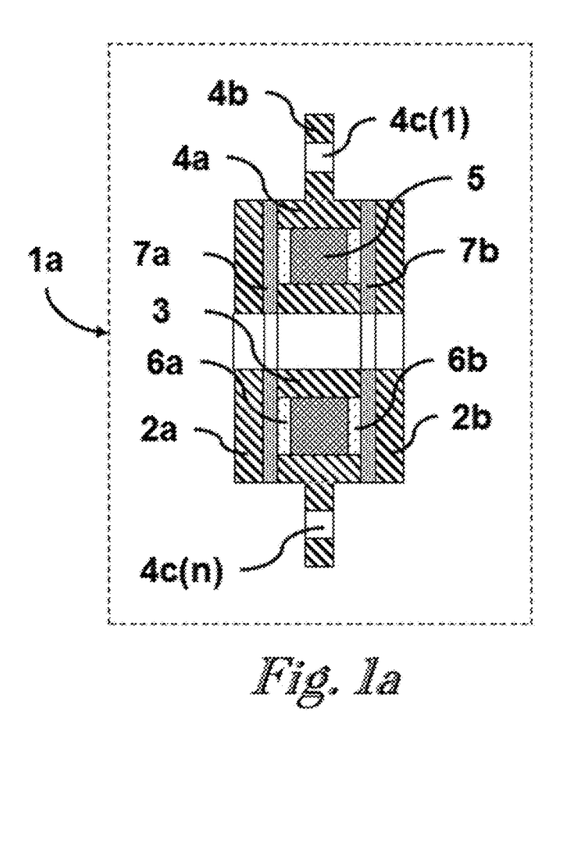
FIG. 1a has an elastic material between the magnet body and the magnetic poles and FIG. 1b has springs between the magnet body and the magnetic poles.
Figure 1B:
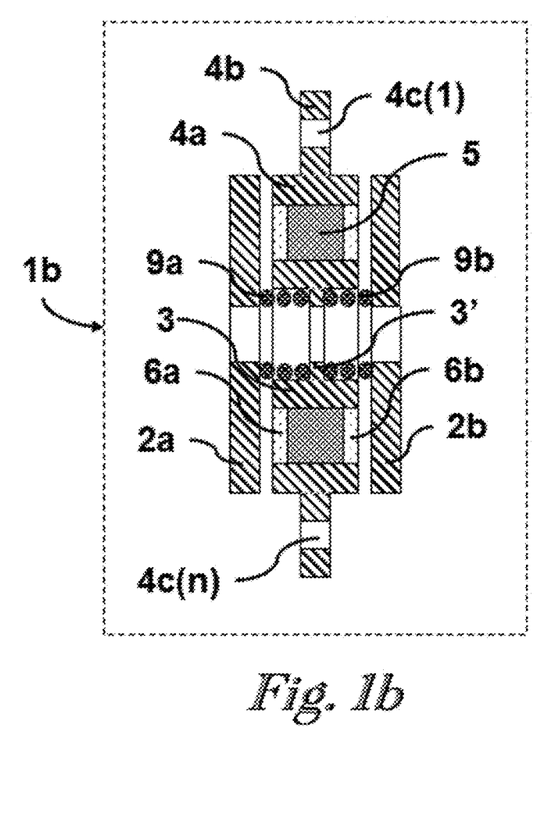
Figure 4:
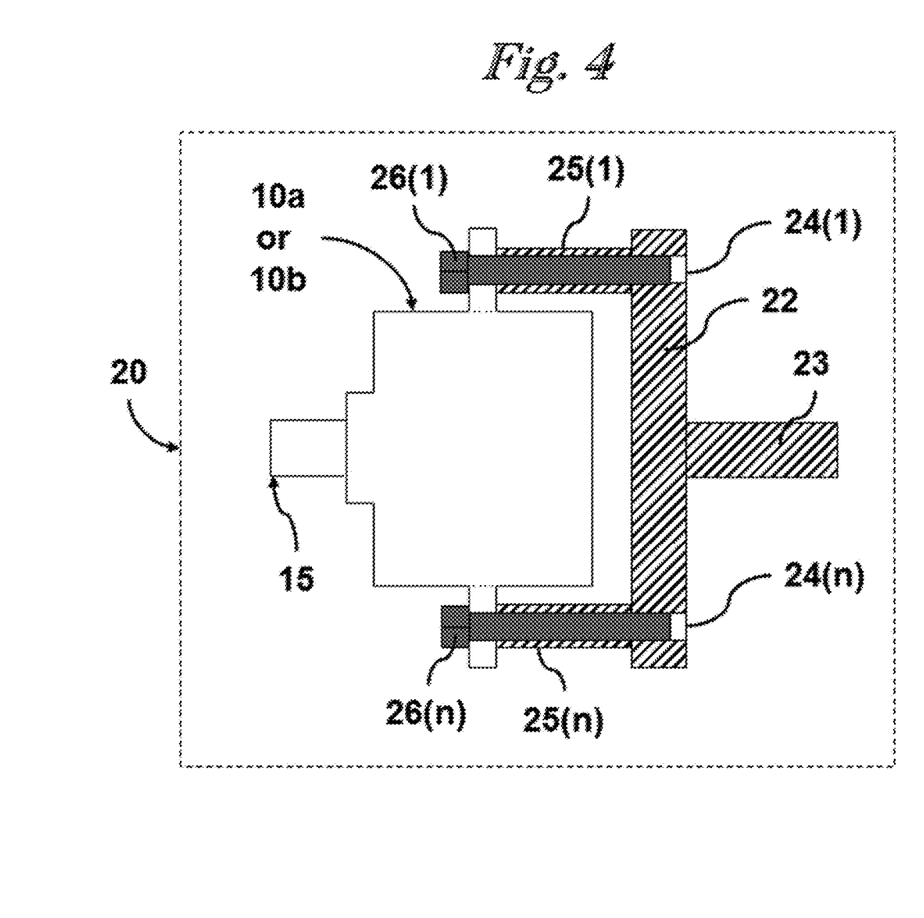
FIG. 4 is a cross sectional view of the present invention with a simple representation of the embodiments of FIG. 3 attached to a second housing to form a magnetic spring assembly for use in a mass damper.

Referring to the drawings in particular, corresponding to FIG. 1, bistable magnetic spring 1 with reference to the embodiments 1a and 1b comprises two disk shaped magnetic poles 2a and 2b; a pancake shaped magnet body comprising an inner cylindrical magnetic pole 3, an outer cylindrical magnetic pole 4a with attachment 4b having mounting holes 4c(1-n), a radially poled permanent magnet 5, and a bonding material 6a and 6b to prevent the magnet 5 from moving; and a spring material which is an elastic material 7a and 7b in FIG. 1a in the gaps and springs 9a and 9b in FIG. 1b to maintain the gaps between the magnet body and the magnetic poles 2a and 2b. The parameter n infers the number of mounting holes 4c required to attach the bistable magnetic spring 1 to the secondary housing as shown in FIG. 4. In FIG. 1b, the extension 3' of the inner cylindrical magnetic pole 3 is to separate the force from the springs 9a and 9b.

It is understood that a different mounting mechanism (4b having 4c) can be used without taking away from the intext of the present invention.

It is further understood that the spring materials 7 and 9 could be replaced with other spring materials or spring mechanisms without taking away from the intext of the present invention.

It is still further understood that the elastic mediums 7a and 7b could be replace with electro active materials, for example an electro active polymer or elastic/piezoelectric material, such that the resonant frequency of the present invention can be actively tuned by an electrical control means.

It is even further understood that the gaps between the magnet body and the magnetic poles 2a and 2b may contain voids to allow unencumbered movement of the magnetic poles 2a and 2b for small movement distances before impinging on the spring materials 7 or 9.

The bistable magnetic spring 1 comprise a permanent magnet system with dual cylindrical flux paths from the magnet 5 in design similar to U.S. Pat. No. 3,022,450 with characteristics of U.S. Pat. No. 6,246,561 in that the inner pole 3 and the outer pole 4a are fixed while the magnetic poles 2a and 2b are moveable.

The dual flux paths give rise to a bistable nature of the bistable magnetic spring 1 as the magnetic flux from the magnet 5 can travel freely in either direction through the outer pole 4a to a magnetic pole 2a or 2b to the inner pole 3 and back to the magnet 5. Given a perfectly centered magnet 5 between the inner pole 3 and the outer pole 4a, and uniform magnetic properties of the inner pole 3, the outer pole 4a, and the magnetic poles 2a and 2b the amount of flux in either direction is controlled by the gaps between the inner and outer poles 3 and 4a, and the magnetic poles 2a and 2b. That is, by providing a means (as the shaft 14 in FIG. 3) to firmly attached the magnetic poles 2a and 2b, and allowing them to move, the gap at one magnetic pole will increase while the gap at other will decreases, where the flux across a gap will increase as the gap decreases. Noting increased flux infers an increased magnetic force on a magnetic poles 2a or 2b and decreased flux infers a decreased force on a magnetic poles 2b or 2a. Further, since the magnetic force is a function of the gap distance squared, a small change in the gap distance will cause the magnetic force on the magnetic poles 2b or 2a to move quickly in an attempt to close the gap.

In the bistable magnetic spring 1 of FIG. 1, the bistable nature or rapid closer of the gaps is controlled by the spring materials 7 or 9, where when the spring materials 7 or 9 are stiff no movement of the magnetic poles 2a and 2b will occur and when the spring materials 7 or 9 are spring like movement of the magnetic poles 2a and 2b can be designed to occur only when an external force is applied to the magnetic poles 2a and 2b. Further the design of the bistable magnetic spring 1, can be such that the applied external force only moves the magnetic poles 2a and 2b a small distance, whereby the magnetic poles 2a and 2b will return to a stable magnetic force position, presumably at equal gap distance. And since the spring materials are spring like, the nature of the movement back to a stable magnetic force position will have a characteristic resonant frequency associated with the movement that can be tuned by changing the magnetic force, the spring material's stiffness or both.

Figure 2:
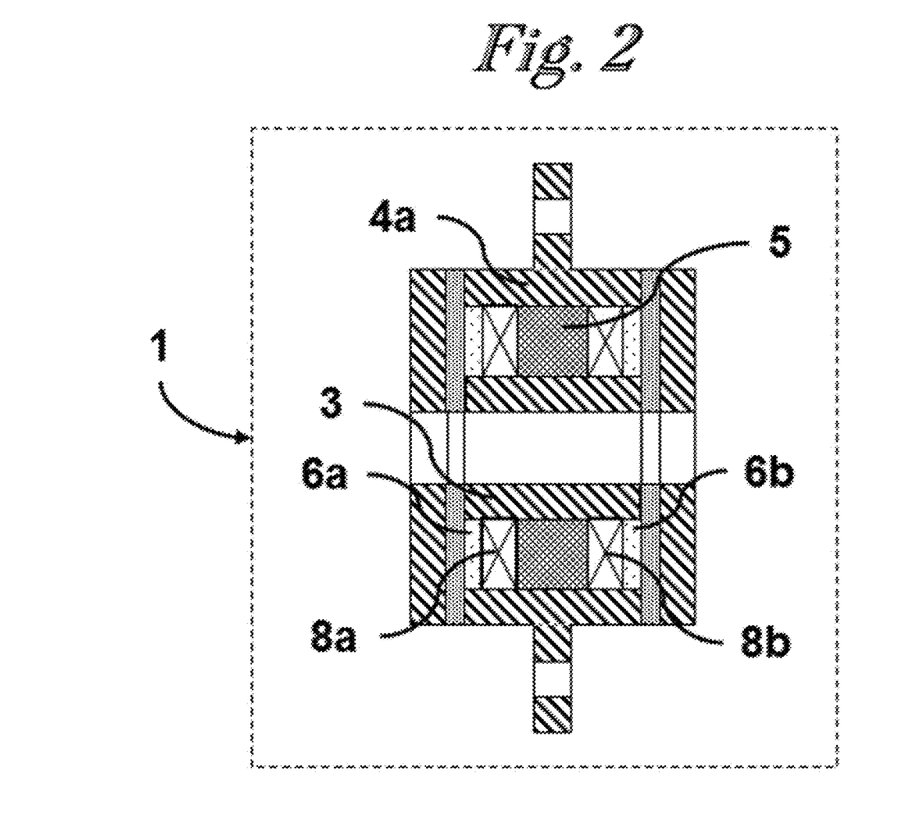
FIG. 2 is a cross sectional view of the bistable permanent magnet spring of FIG. 1a with control coils added to allow active tuning of the resonant frequency of the present invention.

FIG. 2 shows another embodiment of the bistable magnetic spring 1 where controls coils 8a and 8b have been placed on either side of the magnet 5 and inside the inner cylindrical magnetic pole 3 and outer cylindrical magnetic pole 4a with the bonding material 6a and 6b move outward to prevent the control coils 8a and 8b and the magnet 5 from moving. The control coils 8a and 8b when activated with an electrical current will modify the flux from the magnet 5 to increase or decrease the magnetic force associated with the change in flux, where the amount of change in the magnetic force is dependent on the amount and direction of electrical current in each coil.

It is understood that only the bistable magnetic spring 1a is shown in FIG. 2, but the control coils 8a and 8b can also be placed in the bistable magnetic spring 1b in like manner to give the same active control of the magnetic flux in the bistable magnetic spring 1b.

Figure 3A:
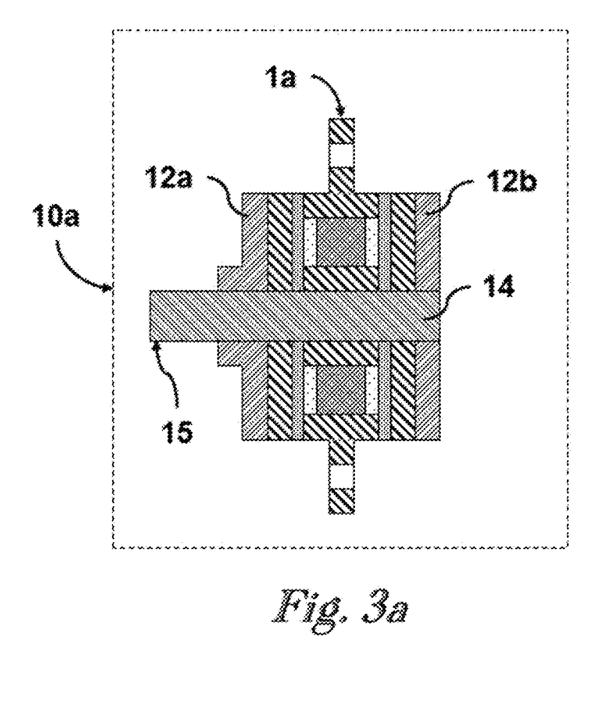
FIG. 3 are a cross sectional views of the two embodiments of the bistable permanent magnet springs of FIG. 1 firmly held in a first attachment housing.
Figure 3B:
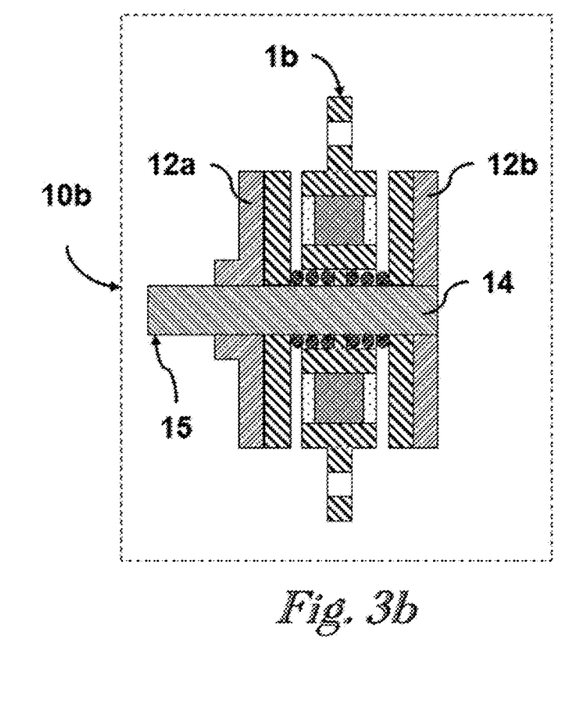

FIG. 3 shows spring assemblies 10a and 10b comprising the bistable magnetic springs 1a and 1b of FIG. 1 in a first housing comprising two non-magnetic circular plates 12a and 12b and a non-magnetic shaft 14 with attachment point 15. Attachment point 15 allows for attachment to a first vibrating mass. In this embodiment, the plates 12a and 12b are firmly attached to the magnetic poles 2a and 2b of the bistable magnetic springs 1a or 1b and with the shaft 14 firmly attached to the plates 12a and 12b. In this configuration, the plates 12a and 12b, magnetic poles 2a and 2b, and shaft 14 move as one unit to become a dual pole armature. Whereby, the bistable force from the magnet 5 is balance between the magnetic poles 2a and 2b of the dual pole armature and mediated by the elastic material 7a and 7b in FIG. 1a or springs 9a and 9b in FIG. 1b to maintain a near equal force on either side of the dual pole armature when the dual pole armature is allowed to oscillate over short distance.

It is understood that the shaft 14 can be firmly attached to the magnetic poles 2a and 2b, as such the plates 12a and 12b may not be needed.

FIG. 4 shows magnetic spring assembly 20 comprising the spring assemblies 10a or 10b of FIG. 3 connected to a second housing comprising a base plate 22 with threaded bolt holes 24(1-n), standoffs 25(1-n), and bolts 26(1-n) to match the mounting holes 4c(1-n) in the bistable magnetic springs 1a or 1b of FIG. 1, and attachment point 23. The standoffs 25(1-n), are to prevent the springs assembly 10a or 10b from impacting the base plate 22. Attachment point 23 allows for attachment to the second primary vibrated structures.

It is understood that the standoffs 25(1-n), base plate 22 and attachment point 23 can be assembled as one housing unit without taking away from the intext of the present invention.

Figure 5:
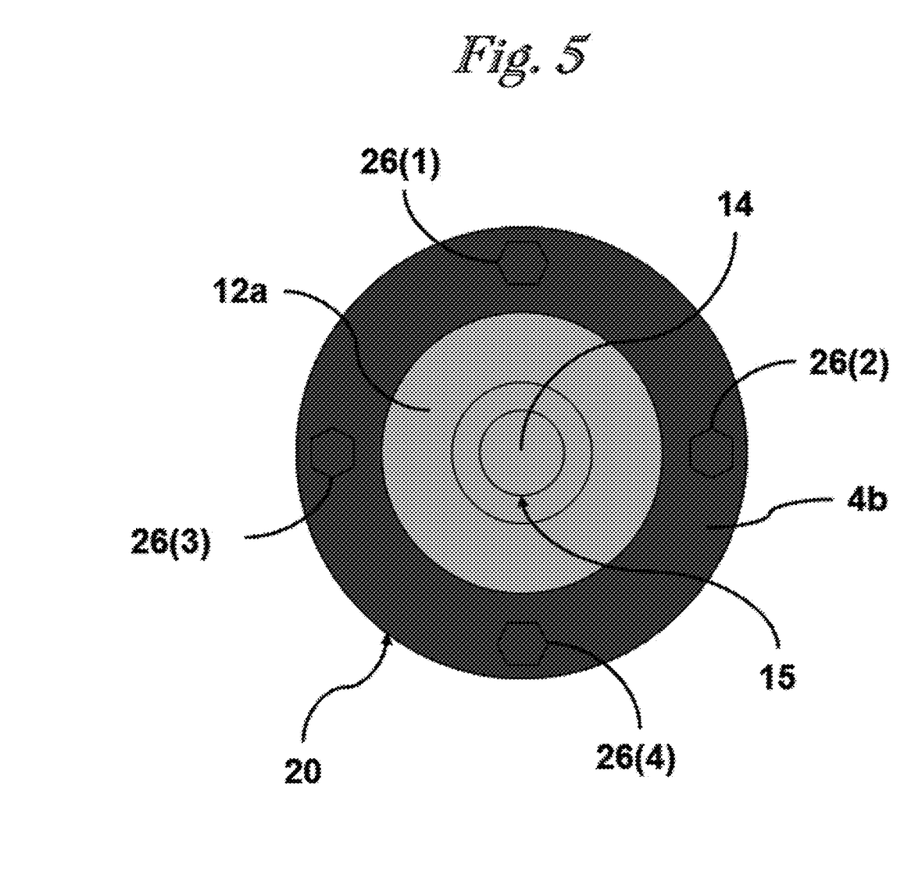
FIG. 5 is a front view of the present invention of FIG. 4 to show one embodiment of the secondary housing attachment points to the embodiments of FIG. 3.

FIG. 5 shows the magnetic spring assembly 20 of FIG. 4 rotated 90 degrees to show the heads of the bolts 26(1-n), the shaft 14 with attachment point 15 of FIG. 3, plate 12a of FIG. 3, and attachment 4b of FIG. 1. In this embodiment only four bolts are shown where n=4. It is understood that more or less bolts 26 can be used or another attachment method can be used without taking away from the intent of the present invention.

Figure 6:
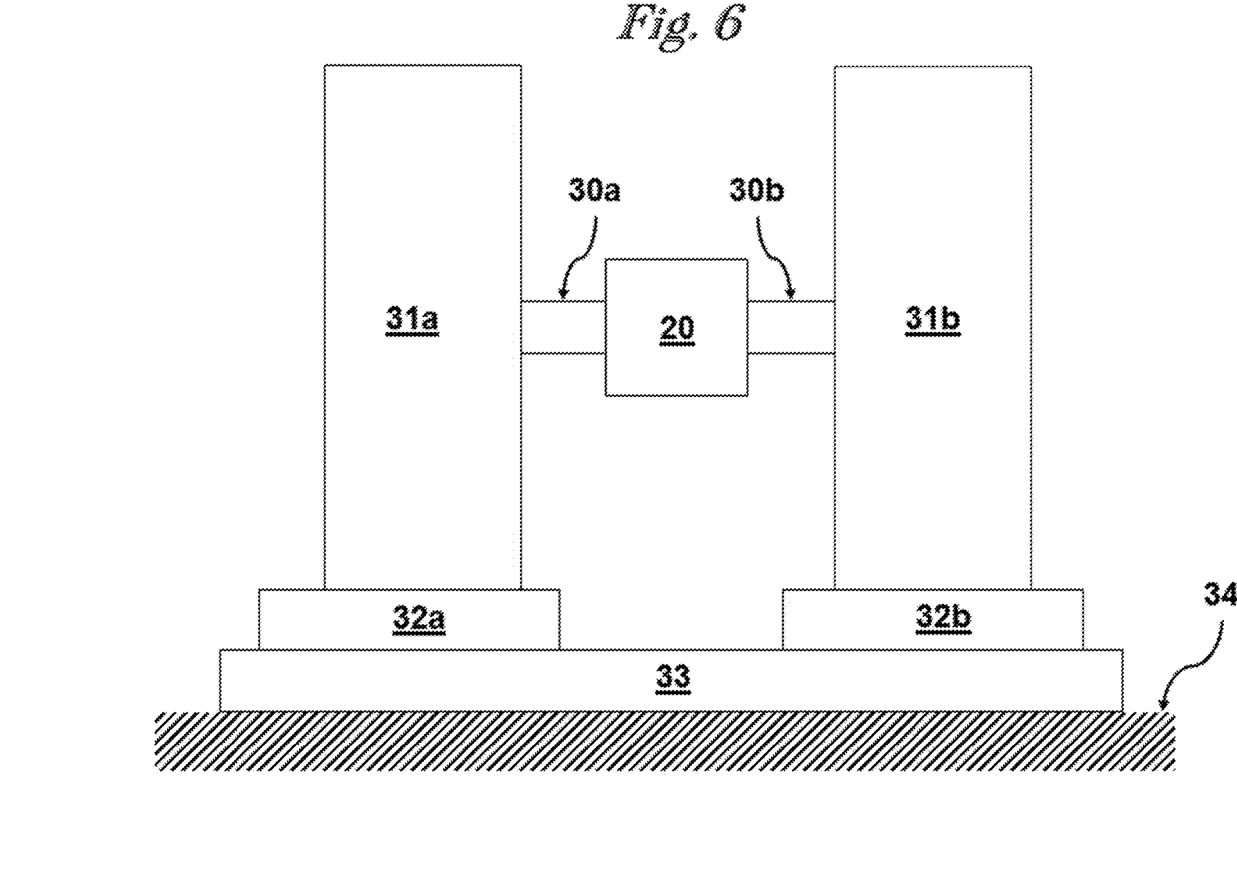
FIG. 6 is a highly simplified schematic view of a mass damper system using the present invention of FIG. 4.

FIG. 6 is given to show one application of the magnetic spring assembly 20 and represents a mass damper system. The masses 31a and 31b are the primary vibrated masses and are firmly mounted to bases 32a and 32b, which is firmly mounted on a common foundation 33 siting on the earth 34. The masses 31a and 31b can independently vibrate on their bases 32a and 32b, from varies direct forces as wind or from indirect forces as earth 34 movement though the foundation 33. To damp these vibrations, at least one magnetic spring assembly 20 is provided, which is coupled with the masses 31a and 31b through members 30a and 30b, which are coupled to the attachment points 15 and 23 of the magnetic spring assembly 20 of FIG. 4.

The magnetic spring assembly 20 in FIG. 5 contains a passive bistable magnetic spring 1a or 1b, which has been tuned to a resonant frequency to prevent vibrations due to direct or indirect forces. It is understood that the magnetic spring assembly 20 could contain control coils or an electro active material as the elastic material 7a or 7b, to which power can be applied by means of an electric control means. The resonant frequency of the magnetic spring assembly 20 can then be varied as a result; making it possible to operate the mass damper 20 as an actively tuned mass damper.

While specific embodiments of the invention have been shown and described in detail to illustrate the application of the principles of the invention, it will be understood that the invention may be embodied otherwise without departing from such principles.

What is claimed:

1. A magnetic spring assembly for use in mass dampers for damping vibrations, the magnetic spring assembly comprising: a first attachment for attaching the magnetic spring assembly to a first mass in a mass damper system; a second attachment for attaching the magnetic spring assembly to a second mass in a mass damper system; a magnet body containing a permanent magnet, an inner magnet pole, and outer magnet pole that is firmly attached to the second attachment, wherein the inner and outer magnet poles are cylindrical with the permanent magnet centrally positioned between the magnet poles and radially poled to allow the flux from the permanent magnet to follow two paths in the magnet poles perpendicular to the poles of the permanent magnet; two magnetic disks, each one is positioned on either side of the magnet body with radial dimension to match the diameter of the outer magnetic pole of the magnet body and has a thickness to carry the magnetic flux between the inner and the outer magnet poles of the magnet body, wherein the magnetic forces on the magnetic disks are directly related to an amount of a flux through the magnetic disks which changes with the a gap between the magnetic disks and the magnet body; a non-magnetic shaft is mounted through the magnet body, firmly attached to the two magnetic disks and the first attachment; and two spring materials of equivalent characteristics, each one on either side of the magnet body, each one is between one magnetic disk and one end of the magnet body to equally resist the magnetic force between the magnetic disks and the magnet body in a spring like fashion, wherein the spring materials attempt to maintain an equal gap between the magnet body and the magnetic disks to maintain an equal bistable magnetic force on the magnetic disks; wherein with a first mass firmly attached to the first attachment and a second mass firmly attached to the second attachment and when an external force is applied to one or both of the attached masses, the shaft will move from a first position to a second position carrying the two magnetic disks; wherein the gap between one magnetic disk and one magnet body end increases while the gap between the second magnetic disk and the other magnet body end decreases; wherein the spring material is compressed in the decreasing gap and relaxed in the increasing gap; wherein the bistable magnetic force on a magnetic disk increases with decreasing gap and decreases with increasing gap, and the compression force from the spring material increases with decreasing gap and decreases with increasing gap; wherein a balanced force on the shaft occurs as a result of the bistable magnetic force and the compression force on the magnetic disks, which is maintained over small distance changes in the gaps; wherein when the external force on the masses is removed the compression forces and bistable magnetic forces on the magnetic disks seek an equilibrium; and wherein the compression forces from the spring material and bistable magnetic forces from the magnet body produces movement of the magnetic disks that is carried by the attached shaft from the first to the second position and back in a spring like fashion to provide a magnetic spring assembly for mass dampers.

2. A magnetic spring assembly with electromagnetic tuning for use in mass dampers for damping vibrations, the magnetic spring assembly comprising: a first attachment for attaching the magnetic spring assembly to a first mass in a mass damper system; a second attachment for attaching the magnetic spring assembly to a second mass in a mass damper system; a magnet body containing a permanent magnet, two control coils, an inner magnet pole, and an outer magnet pole that is firmly attach to the second attachment, wherein the inner and outer magnet poles are cylindrical with the permanent magnet centrally positioned between the inner and outer magnet poles and radially poled to allow the flux from the permanent magnet to follow two paths in the magnet poles perpendicular to the poles of the permanent magnet, and wherein one control coil is placed on either side of the permanent magnet between the magnet poles and radially poled; wherein when a bistable magnetic force on magnetic disks is not equal across the magnetic body, an electromagnetic tuning of the bistable magnetic force is achieved by applying current to the control coils; two magnetic disks, each one on either side of the magnet body, with radial dimension to match a diameter of the outer magnetic pole of the magnet body and a thickness to carry the magnetic flux between the inner and outer magnet poles of the magnet body, wherein the magnetic forces on the magnetic disks are directly related to an amount of flux through the magnetic disks which changes with the a gap between the magnetic disks and the magnet body; a nonmagnetic shaft placed through the magnet body, firmly attached to the two magnetic disks and the first attachment; and two spring materials of equivalent characteristics, each one on either side of the magnet body, and each between one magnetic disk and an end of the magnet body to equally resist the magnetic force between the magnetic disks and the magnet body in a spring like fashion, wherein the spring materials attempt to maintain an equal gap between the magnet body and the magnetic disks to maintain an equal bistable magnetic force on the magnetic disks; wherein with a first mass firmly attached to the first attachment and a second mass firmly attached to the second attachment and when an external force is applied to one or both of the attached masses, the shaft will move from a first position to a second position carrying the two magnetic disks; wherein the gap between one magnetic disk and one magnet body end increases while the gap between the second magnetic disk and the other magnet body end decreases; wherein the spring material is compressed in the decreasing gap and relaxed in the increasing gap; wherein the bistable magnetic force on a magnetic disk increases with decreasing gap and decreases with increasing gap, and the compression force from the spring material increases with decreasing gap and decreases with increasing gap; wherein a balanced force on the shaft occurs as a result of the bistable magnetic force and the compression force on the magnetic disks, which is maintained over small distance changes in the gaps; wherein when the external force on the masses is removed, the compression force and bistable magnetic forces on the magnetic disks seek an equilibrium; and wherein the compression force from the spring material and the electromagnetic tuned bistable magnetic forces from the magnet body produce movement on the magnetic disks that is carried by the attached shaft from the first to second position and back in a spring like fashion to provide a magnetic spring assembly with electromagnetic tuning for mass dampers.

3. The magnetic spring assembly of claim 1, wherein the spring material is an elastic material.

4. The magnetic spring assembly of claim 1, wherein the spring material is a spring.

5. The magnetic spring assembly of claim 1, wherein the spring material is an electroactive polymer to electrically change the characteristics of the spring material to allow electronic tuning of the spring characteristics of the magnetic spring assembly.

6. The magnetic spring assembly of claim 1, wherein the gap contains a void to allow unencumbered movement of the magnetic pole disks for small movement distances before impinging on the spring material.

7. The magnetic spring assembly of claim 1, wherein the spring material is an elastic material combined with a piezoelectric material to electrically change the stiffness of the elastic material when an electric voltage is applied to allow electronic tuning the spring characteristics of the magnetic spring assembly.

8. The magnetic spring assembly of claim 2, wherein only one control coil is used to provide an imbalance electromagnetic tuning of the magnetic spring assembly.

9. The magnetic spring assembly of claim 2, wherein the control coils are used to reduce the flux from the permanent magnet.

10. The magnetic spring assembly of claim 2, wherein the control coils are used for external force adjustments to the mass damping system that the magnetic spring assembly is applied.

11. The magnetic spring assembly of claim 2, wherein the spring material is an elastic material.

12. The magnetic spring assembly of claim 2, wherein the spring material is a spring.

13. The magnetic spring assembly of claim 2, wherein the spring material is an electroactive polymer to electrically change the characteristics of the spring material to allow electronic tuning of the spring characteristics of the magnetic spring assembly.

14. The magnetic spring assembly of claim 2, wherein the gap contains a void to allow unencumbered movement of the magnetic pole disks for small movement distances before impinging on the spring material.

15. The magnetic spring assembly of claim 2, wherein the spring material is an elastic material combined with a piezoelectric material to electrically change the stiffness of the elastic material when an electric voltage is applied to allow electronic tuning the spring characteristics of the magnetic spring assembly.

* * * * *